US006522603B1

(12) United States Patent
Miyahara et al.

(10) Patent No.: US 6,522,603 B1
(45) Date of Patent: Feb. 18, 2003

(54) CHARGING DEVICE FOR ELECTRONIC TIMEPIECE, ELECTRONIC TIMEPIECE, AND METHOD FOR CONTROLLING CHARGING DEVICE

(75) Inventors: Fumiaki Miyahara, Matsumoto (JP); Shinji Nakamiya, Matsumoto (JP); Yoshitaka Iijima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 28 days.

(21) Appl. No.: 09/705,475

(22) Filed: Nov. 2, 2000

(30) Foreign Application Priority Data

Nov. 4, 1999 (JP) .......................................... 11-314285

(51) Int. Cl.[7] .................................................. H02J 9/04
(52) U.S. Cl. ....................................... 368/203; 368/204
(58) Field of Search ................................. 368/203, 205

(56) References Cited

U.S. PATENT DOCUMENTS 4,730,287 A 3/1988 Yoshino et al.
5,001,685 A 3/1991 Hayakawa
5,500,562 A * 3/1996 Kelley ......................... 307/64
6,343,051 B1 * 1/2002 Yabe et al. ................. 368/204
6,396,772 B1 * 5/2002 Yabe et al. ................. 368/204

FOREIGN PATENT DOCUMENTS

JP 09-264971 10/1997

* cited by examiner

*Primary Examiner*—Vit Miska
*Assistant Examiner*—Jeanne Marguerite Goodwin
(74) *Attorney, Agent, or Firm*—Rosalio Haro

(57) ABSTRACT

An electronic timepiece charging device for charging an electronic timepiece comprising: a generator for converting external energy into electric energy; a secondary power source for storing the electric energy generated by the generator; a timepiece driving circuit for performing a time-keeping operation; and a time display circuit for displaying time information from the timepiece driving circuit, wherein, the timepiece driving circuit is connected in parallel to the secondary power source; and the secondary power source comprises an equivalent capacitive component for storing an electric charge and a resistive component formed by a part of the equivalent capacitive component. The resistance value of the resistive component is set to a value such that a voltage drop is caused, whereby when the generator generates a current equal to or greater than a predetermined value, a voltage to be applied to the timepiece driving circuit by the generator is equal to or greater than the lowest operation starting voltage.

22 Claims, 9 Drawing Sheets

CHARGING DEVICE FOR ELECTRONIC TIMEPIECE, ELECTRONIC TIMEPIECE, AND METHOD FOR CONTROLLING CHARGING DEVICE

BACKGROUND OF THE INVENTION

1. Field of the Invention

The present invention relates to a charging device for an electronic timepiece having a generator for receiving at least one type of external energy and converting the external energy into electric energy and a charge storer for storing the electric energy generated by the generator. The present invention further relates to an electronic timepiece using such a charging device, and a method for controlling the charging device.

2. Description of the Related Art

A small-sized electronic timepiece such as a wristwatch has a time-keeping circuit for measuring time and a timepiece driving circuit including a driving circuit for driving a motor which is coupled to a hand moving mechanism, i.e., a mechanism to move hands of the timepiece. Electronic timepieces having a generator therein have been realized in the art, which can operate without having to replace a used battery.

In these electronic timepieces, the electric power generated by the generator can be once charged into a secondary power source such as a capacitor. Therefore, when no electric power is being generated, time display is performed by the electric power which is discharged from the secondary power source. This enables the timepiece to stably operate over a long period of time without a battery.

In view of the labor and time for replacing a used battery or the problems associated with the disposal of used batteries, it is expected that more electronic timepieces will be provided with a generator in the future.

Generators which are provided in a timepiece such as a wristwatch include a solar battery which converts incident light into electric energy, a power generation system which converts kinetic energy of the movement of the user's arm into electric energy, etc.

These generators are quite desirable in that they can utilize energy around the user by converting it into electric energy. However, the available energy density is small, and the energy cannot be obtained continuously. Therefore, power is not generated continuously. During the non-power-generation periods (i.e., when the generator is in an inoperative state), the electronic timepiece is operated by the electric power which has been stored in the secondary power source.

In the case of an electronic device with a solar battery installed, for example, no electric power is generated by the solar battery in the nighttime. In such an electronic device with a solar battery installed, a charge storer discharges to operate a processing device. Therefore, it is desired to increase the storage capacity of the charge storer so as to accommodate situations where no electric power is generated by the power generation system. However, an increase in the storage capacity of the charge storer also increases the time required to charge the capacitor device. As a result, once the capacitor device is completely discharged off, it then takes a long time for the capacitor device to be charged to a predetermined voltage sufficient to operate the processing device. Thus, once a device employing a solar battery stops operating, for example, it will take some time to start up the device even after the device is placed back into an environment where light is incident upon the solar battery and the power generation has been resumed.

A number of circuits have been devised in the art to shorten the processing device start-up time in such situations.

An example of such circuits is shown in FIG. 8 which is a block diagram illustrating portable electronic equipment (an electronic timepiece) having a solar battery as described in Japanese Patent Provisional Publication No. 9-264971, entitled "Power Control Device, Power Generation Device and Electronic Equipment".

In FIG. 8, the electronic timepiece includes a solar battery 501, a capacitor device 513, and a power control section 520.

The solar battery 501 converts energy of the sunlight into electric power.

The capacitor device 513 stores the electric power from the solar battery 501.

The power control section 520 supplies the electric power from the solar battery 501 to the large-capacity capacitor device 513 and to a processing device 509 such as a time-keeping device.

The capacitor device 513 will now be described in detail.

The capacitor device 513 includes a capacitor 502, diodes 517, 521, 522 and 529, switches 518, 523 and 524, a limit switch 519, and a control circuit 530.

The capacitor 502 is a large-capacity capacitor such as an electric doublelayer capacitor.

The switch 523 is coupled between the ground power rail (which in the present case is used as the reference high voltage VDD) and the anode of diode 522. When switch 523 is actuated (i.e. is closed) it forms a bypass current path around diode 521. Diodes 521 and 522 are coupled end-to-end such that when switch 523 is not actuated (i.e. is opened), diodes 521 and 522 are effectively serially connected with each other. In the electronic timepiece illustrated in FIG. 8, the reference high voltage VDD is the ground voltage power rail (reference voltage), and the VSS line is the relative low voltage. To emphasize that VDD is implemented by the ground power rail, the term "ground voltage VDD" is at times used to refer to the reference high source, i.e. high side, of the circuit.

The switch 524 is coupled between the VDD voltage and the cathode of diode 522. When switch 524 is actuated (i.e. is closed), it forms a bypass current path around both of the diodes 521 and 522.

The diode 529 is provided between the solar battery 501 and one of the terminals of the capacitor 502 which is on the VSS voltage (low voltage) side. The diode 529 functions as a reverse current flow prevention diode. Specifically, the diode 529 is operative to ensure that a voltage which is discharged from the capacitor 502 while no power is being generated from the solar battery 501 is not applied to the solar battery 501.

The diode 517 is operative to ensure that a current does not flow in the reverse direction from an auxiliary capacitor device 516 including a small-capacity capacitor 503 to the solar battery 501.

The switch 518 is a switch provided for controlling a discharge from the capacitor device 513 into the auxiliary capacitor device 516.

The limit switch 519 short-circuits the high voltage side VDD and the low voltage side VSS with each other when the voltage supplied from the solar battery 501 is too high. In this way, it is possible to prevent the capacitor device 513 from being overcharged so that a high voltage is not applied to the processing device 509, etc.

The control circuit 530 monitors various voltages in the power control section 520 and controls the switches. The control circuit 530 detects a voltage VSCP on the high voltage side of the capacitor device 513, a voltage VSCN on the low voltage side of the capacitor device 513, the voltage VSS which is supplied to the processing device 509, etc.

Based on the detection results, the control circuit 530 outputs control signals for controlling the switch 523 and the switch 524, respectively. The control circuit 530 also outputs a control signal for controlling the switch 518 (which is provided for controlling the discharge from the capacitor device 513 into the auxiliary capacitor device 516), and a control signal for controlling the limit switch 519.

With the configuration as described above, a charge voltage VSC of the capacitor device 513 is equal to the difference between the terminal voltages thereof, i.e., between the high potential side voltage VSCP and the low potential side voltage VSCN. However, when light is illuminated onto the solar battery 501 while substantially no electric charge is stored in the capacitor device 513 and the charge voltage VSC is substantially 0 V, the switches 523 and 524 are turned OFF.

Therefore, the electric power supplied from the solar battery 501 is dropped by a forward bias voltage of the diodes 521 and 522. Thereafter, the electric power is supplied to the capacitor device 513. Thus, a voltage drop is caused by the diodes 521 and 522.

In this way, it is possible to increase the voltage to be applied to the processing device 509 by an amount corresponding to the voltage drop.

As the charge voltage VSC of the capacitor 502 gradually increases and reaches a predetermined setting voltage, the switch 523 and the switch 524 are sequentially turned ON. Thus, the diodes 521 and 522 are bypassed, thereby increasing the charge voltage VSC to the capacitor 502.

In the conventional example shown in FIG. 8, two diodes 521 and 522 are used in order to increase the voltage to be applied to the processing device 509. However, in alternative circuit configurations, resistive elements may be used in place of the diodes 521 and 522 (see, for example, U.S. Pat. Nos. 5,001,685 and 4,730,287).

In the above-described conventional example, a voltage decreasing means such as a diode, a resistor, or the like, is provided between a capacitor, which is used as the secondary power source, and the ground voltage VDD in order to increase the voltage applied to the processing device such as a timepiece driving circuit at the beginning of power generation. Moreover, a line is provided and connected to the terminals of the capacitor for detecting the charge voltage of the capacitor (the voltage between VSCP and VSCN in FIG. 8).

In such a configuration, it is necessary to isolate one of the terminals of the secondary power source (terminal A in FIG. 8) from the ground voltage VDD. In addition, it is necessary to provide a power supply line for supplying the voltage at terminal A while isolating the power supply line from the ground voltage VDD to a circuit board mounting thereon a control circuit, a timepiece driving circuit, and the like.

FIG. 9 is a partial cross-sectional view illustrating how a circuit board is placed in an electronic timepiece.

In FIG. 9, a secondary power source (the capacitor 502) is provided separately from a circuit board 601. The terminal A of the capacitor 502 is connected to a predetermined contact point on the circuit board 601 by a connection member 602, e.g., a contact point spring, or the like.

A circuit hold plate 603 for holding down the circuit board 601 is made of an electrically conductive material such as a stainless having a potential equal to the ground voltage VDD.

A circuit spacer 604 is made of an insulating member. The circuit spacer 604 and the circuit hold plate 603 together sandwich the circuit board 601 therebetween.

The circuit board 601 is secured by a press-fit member 605, which is press-fit through the circuit spacer 604, and a screw 606.

A circuit insulating plate 607 is provided between the circuit board 601 and the circuit hold plate 603. The circuit insulating plate 607 is made of an insulating material. The circuit insulating plate 607 insulates lines on the circuit board 601 from the ground voltage VDD.

A base plate 608 is secured to the circuit spacer 604 by the press-fit member 605.

The base plate 608 is further secured by a circuit case.

With the configuration as described above, where one of the terminals (terminal A) of the secondary power source (the capacitor 502) is connected to the predetermined contact point on the circuit board 601 by a contact point spring (the portion indicated by a broken line 602), or the like, the power source potential of the secondary power source may be instable.

This is because the contact resistance of the electrically conductive member varies due to a shock.

Moreover, it is necessary to ensure a sufficient ground space on the circuit board 601 to insulate signal lines and grounded points from the power supply line of the secondary power source by providing an insulating mechanism or a sufficient creepage distance. This has prevented the size of the circuit board 601 from being reduced. Therefore, it has not been possible to employ such a voltage-increasing configuration as described above in a small analog electronic timepiece for women.

Moreover, the positive terminal A of the secondary power source has a voltage that is different than the ground voltage VDD. Therefore, it is not possible to directly connect the positive terminal A of the secondary power source and the connection member 602 to the grounded points. Furthermore, it is necessary to provide the insulating member for providing an insulation from the contact point.

Moreover, as illustrated in FIG. 8, a circuit for causing a voltage drop is provided by using a diode. In such a case, no current flows through the diodes 521 and 522 while the switches 523 and 524 are OFF and no electric power is being generated. Therefore, the terminal and lines for detecting the voltage VSCP are brought into a high impedance state and thus are more likely to be influenced by noise.

OBJECTS OF THE INVENTION

In view of the above, an object of the present invention is to provide a charging device for an electronic timepiece having a function of boosting the voltage at the beginning of power generation, an electronic timepiece using such a charging device, and a method for controlling the charging device. The present invention also aims to allow the ground voltage side terminal of the secondary power source to be grounded directly.

SUMMARY OF THE INVENTION

In accordance with an aspect of the present invention, an electronic timepiece charging device for charging an electronic timepiece comprises: a generator for receiving at least one type of external energy and converting the external energy into electric energy; a capacitor device for storing the electric energy generated by said generator; a timepiece circuit connected in parallel to said capacitor device for performing a time-keeping operation, said timepiece circuit being driven by the electric energy generated by said generator or the electric energy stored in said capacitor device; and a display circuit for displaying time information from said timepiece circuit, wherein:

said timepiece circuit is connected in parallel to said capacitor device;

said capacitor device comprises an equivalent capacitive component for storing an electric charge and a resistive component formed by a part of said equivalent capacitive component; and a resistance value of said resistive component is set in such manner that when the generator outputs a current equal to or greater than a predetermined value by means of a voltage drop caused by a charging current of said resistive component, a voltage to be applied to said timepiece circuit by the generator is equal to or greater than a voltage at which said timepiece circuit starts operating.

Preferably, said resistive component has a resistance value which is equal to or greater than a value obtained by dividing an operation starting voltage of the timepiece circuit by a current generated by said generator, or a value obtained by first subtracting a remaining charge voltage of said capacitor device at a time when the timepiece circuit stops operating from the operation starting voltage of the timepiece circuit to obtain a difference therebetween, and then dividing said difference by the current generated by said generator.

Preferably, said generator comprises a photoelectric power generator, a magnetoelectric power generator, a thermoelectric power generator, or a piezoelectric power generator.

Preferably, said capacitor device equivalently comprises one capacitive component and one resistive component which are serially connected with each other.

Preferably, said capacitor device equivalently comprises a plurality of pairs of capacitive components and resistive components which are connected in parallel to one another, each pair having one capacitive component and one resistive component which are serially connected with each other.

Preferably, said capacitor device is a lithium secondary battery comprising an electrolytic solution of an organic solvent having a lithium salt dissolved therein, a negative pole activator using titanium oxide, and a positive pole activator using manganese oxide.

Preferably, said capacitor device is a lithium secondary battery comprising an electrolytic solution of an organic solvent having a lithium salt dissolved therein, a negative pole activator using a carbon material, and a positive pole activator using lithium titanate.

Preferably, wherein said capacitor device comprises an electrolytic capacitor.

Preferably, said generator comprises an AC generator, and a charging time constant of said capacitor device is less than or equal to one cycle of a half-wave- or full-wave-rectified waveform of a current generated by said AC generator.

Preferably, one terminal of said capacitor device is grounded to a ground potential which is common among said generator, said timepiece circuit and said capacitor device.

Preferably, one terminal of said capacitor device is grounded to an electrically conductive attachment member having said ground potential.

In accordance with another aspect of the present invention an electronic timepiece comprises:

a generator for receiving at least one type of external energy and converting the external energy into electric energy;

a capacitor device for storing the electric energy generated by said generator;

a timepiece circuit connected in parallel to said capacitor device for performing a time-keeping operation, said timepiece circuit being driven by the electric energy generated by said generator or the electric energy stored in said capacitor device;

a display circuit for displaying time information from said timepiece circuit; and the above-described charging device.

In accordance with another aspect of the present invention, a method for controlling a charging device for an electronic timepiece is provided. The charging device includes a generator for receiving at least one type of external energy and converting the external energy into electric energy; a capacitor device for storing the electric energy generated by said generator; a charging device for charging said capacitor device; a timepiece circuit connected in parallel to said capacitor device for performing a time-keeping operation, said timepiece circuit being driven by the electric energy generated by said generator or the electric energy stored in said capacitor device; and a display circuit for displaying time information from said timepiece circuit. The method comprises:

connecting the timepiece circuit in parallel to said capacitor device;

forming said capacitor device by an equivalent capacitive component for storing an electric charge and a resistive component formed by a part of said equivalent capacitive component; and setting a resistance value of the resistive component in such manner that when said generator outputs a current equal to or greater than a predetermined value by means of resistance value of said resistive component, a voltage to be applied to said timepiece circuit by said generator is equal to or greater than a voltage at which said timepiece circuit starts operating.

In accordance with another aspect of the present invention, an electronic timepiece charging device comprises:

a generator for receiving at least one type of external energy and converting the external energy into electric energy; a capacitor device for storing the electric energy generated by said generator; a timepiece circuit connected in parallel to said capacitor device for performing a time-keeping operation, said timepiece circuit being driven by the electric energy generated by said generator or the electric energy stored in said capacitor device; and a display circuit for displaying time information from said timepiece circuit, wherein:

said timepiece circuit is connected in parallel to said capacitor device;

said capacitor device comprises at least an equivalent capacitive component for storing an electric charge and a resistive component; and where a voltage in said capacitor device to be supplied to said timepiece circuit is less than an operation starting voltage of said timepiece circuit, and when said timepiece circuit has stopped operating and in addition when a charging current flows into said capacitor device due to power generation by said generator, said the capacitor device supplies to said timepiece circuit a voltage which is equal to or greater than the operation starting voltage of said timepiece circuit by utilizing at least a voltage difference caused by said resistive component.

In accordance with another aspect of the present invention, a method for controlling a charging device for an electronic timepiece including: a generator for receiving at least one type of external energy and converting the external energy into electric energy; a capacitor device for storing the electric energy generated by said generator; a timepiece circuit connected for performing a time-keeping operation, said timepiece circuit being driven by the electric energy generated by said generator or the electric energy stored in said capacitor device; and a display circuit for displaying time information from said timepiece circuit. The method comprises:

connecting said timepiece circuit in parallel to said capacitor device;

forming said capacitor device by at least an equivalent capacitive component for storing an electric charge and a resistive component; and where a voltage in said capacitor device to be supplied to said timepiece circuit is less than an operation starting voltage of said timepiece circuit, and when said timepiece circuit has stopped operating and in addition when a charging current flows into said capacitor device due to power generation by said generator, controlling said capacitor device to supply to said timepiece circuit a voltage which is equal to or greater than the operation starting voltage of said timepiece circuit by utilizing at least a voltage difference caused by said resistive component.

BRIEF DESCRIPTION OF THE DRAWINGS

In the drawings, wherein like reference symbols refer to like parts.

DESCRIPTION OF THE PREFERRED EMBODIMENTS

Preferred embodiments of the present invention will now be described with reference to the accompanying drawings.

Figure 1:
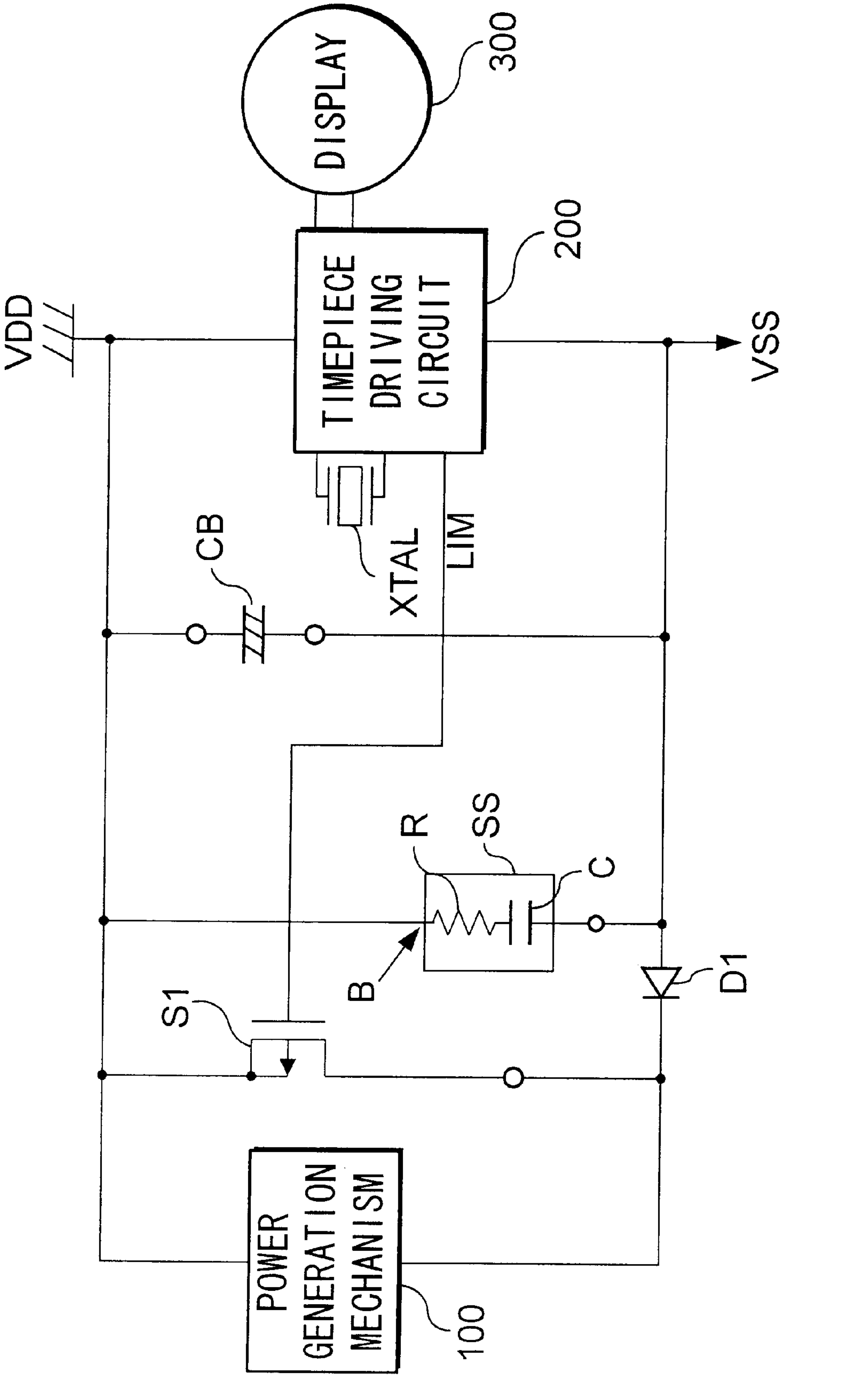
FIG. 1 is a block diagram illustrating one embodiment of an electronic timepiece according to the present invention.

FIG. 1 is a block diagram illustrating one embodiment of an electronic timepiece according to the present invention.

The electronic timepiece illustrated in FIG. 1 is a wristwatch which is worn by a user by passing a belt attached to the body of the timepiece around the user's wrist.

A generator 100 comprises a generator utilizing such generating effects as a photoelectric effect (particularly, a photoelectric effect using sunlight), a magnetoelectric effect, a thermoelectric effect or a piezoelectric effect. A secondary power source SS which stores the electric power generated by the generator 100 is connected to the generator 100 via a reverse flow prevention diode D1. One terminal of the secondary power source SS is connected directly to a common ground voltage VDD which is also connected to the positive side output terminal of the generator 100, the positive side power source terminal of a timepiece driving circuit 200, or the like. The other terminal of the secondary power source SS is connected to another terminal of the timepiece driving circuit 200 which is connected to the low potential side power source voltage VSS. In this example, the ground voltage VDD which is on the high potential side of the secondary power source SS having the high potential side voltage is used as the ground (reference) voltage GND, and the low potential side voltage is used as VSS. In alternative configurations, the voltage VSS may be used as the ground potential GND.

The timepiece driving circuit 200 keeps time based on the clock produced by oscillation of a quartz oscillator XTAL which has an oscillation frequency of 32 kHz, for example. The timepiece driving circuit 200 drives and controls a time display circuit 300 which may be an analog display circuit having an hour hand, a minute hand, etc., or a liquid crystal digital display circuit.

The timepiece driving circuit 200 also detects when the voltage generated by the generator 100 exceeds a predetermined voltage. When the generated voltage exceeds the predetermined voltage, a signal LIM is brought to a low level. This turns a switch S1 to ON, which is connected in parallel to the respective output terminals of the generator 100, to short-circuit the output terminals of the generator 100 with each other, thereby implementing a limit control to prevent a high voltage from being applied to the secondary power source SS or other circuits.

In this example, the switch S1 may be a P-channel MOS (metal oxide semiconductor) transistor. A power source voltage between the high potential of the voltage VDD and the low potential of the voltage VSS is applied to the timepiece driving circuit 200. The secondary power source SS and an auxiliary capacitor CB are each connected in parallel between the power source voltage terminals.

The secondary power source SS may be, for example, a lithium secondary battery. The secondary power source SS may equivalently include a capacitive component C for storing an electric charge, and a resistive component R which is formed by a constructing member of the equivalent capacitive component C.

The lithium secondary battery uses an organic (lithium) solvent as its electrolytic solution. Such a lithium secondary battery has a feature that the resistive component R takes a larger value as compared with other secondary batteries such as a Ni—Cd secondary battery using an aqueous (KOH+$H_2O$) electrolytic solution.

Figure 8:
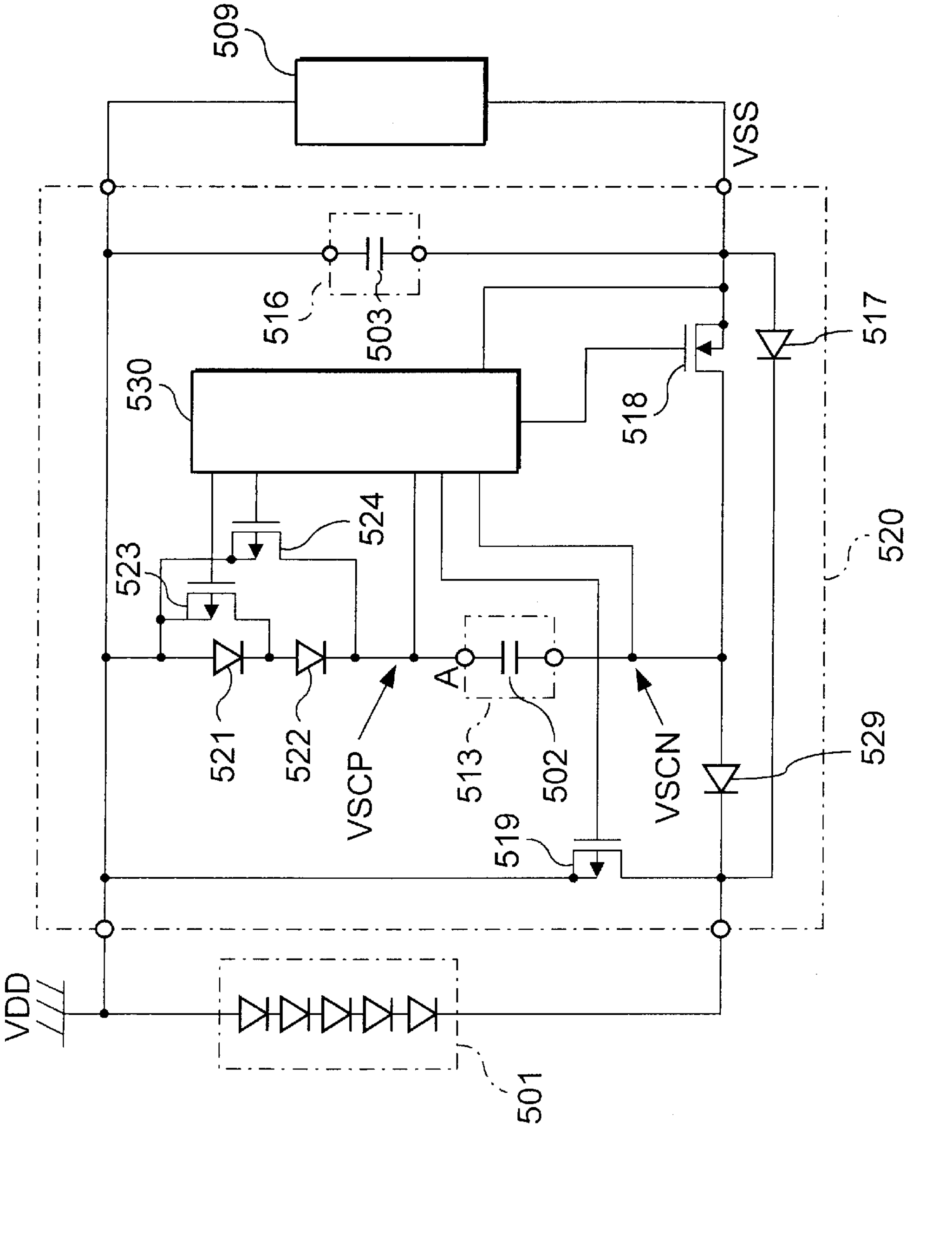
FIG. 8 PRIOR ART
FIG. 8 is a block diagram illustrating a configuration of a conventional electronic timepiece.

According to the present invention, the resistive component R which is inherent to the structure of the secondary power source SS is used in place of the diodes 521 and 522 illustrated in FIG. 8, for example.

In the present invention, the voltage to be applied to the timepiece driving circuit 200 is increased at the beginning of power generation (when the charge voltage of the secondary power source SS is low) by means of a voltage drop which occurs at the resistive component R by the charging current from the generator 100.

The secondary power source SS may suitably be a lithium secondary battery as described above which uses an organic solvent as its electrolytic solution.

Such lithium secondary batteries which can be suitably used as the secondary power source SS of the present invention include lithium batteries as disclosed in Japanese Patent Publication No. 63-1708, entitled "Organic Electrolytic Solution Secondary Battery," or Japanese Patent Provisional Publication No. 10-64592, entitled "Lithium Secondary Battery."

The "organic electrolytic solution secondary battery" as disclosed in Japanese Patent Publication No. 63-1708 includes an electrolytic solution of an organic solvent having a lithium salt dissolved therein, a negative pole activator using titanium oxide, and a positive pole activator using manganese oxide.

The "lithium secondary battery" as disclosed in Japanese Patent Provisional Publication No. 10-64592 includes an electrolytic solution of an organic solvent having a lithium salt dissolved therein, a negative pole activator using a carbon material, and a positive pole activator using lithium titanate.

These lithium secondary batteries have the feature that the resistive component R can be increased, and therefore can be suitably used as the secondary power source SS of the present invention.

As an alternative example of the secondary power source SS, an electrolytic capacitor may be used such as a super capacitor which uses an electrolytic solution.

Figure 2A:
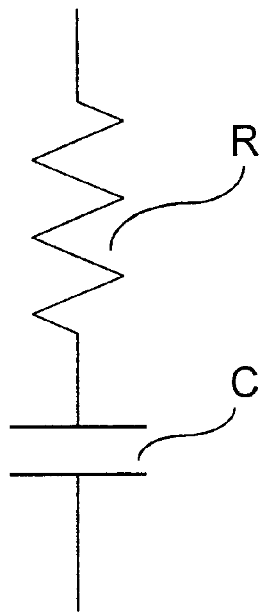
FIGS. 2A and 2B are diagrams respectively illustrating two exemplary equivalent circuits of a secondary power source SS illustrated in FIG. 1.

As illustrated in FIG. 2A, the secondary power source SS may equivalently include one capacitive component C and one resistive component R which are serially connected with each other.

Figure 2B:
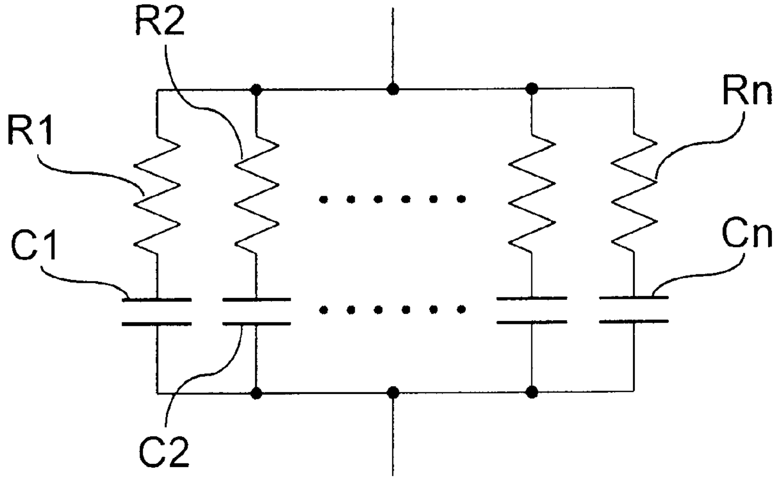

Alternatively, as illustrated in FIG. 2B, the secondary power source SS may equivalently include a plurality of pairs (n pairs) of capacitive components C1 to Cn and resistive components R1 to Rn which are connected in parallel to one another, each pair having one capacitive component C and one resistive component R which are serially connected with each other.

The resistance value of the resistive component R is used to drive a timepiece which has stopped operating.

Specifically, the resistance value of the resistive component R is used to drive timepiece in the situation in which the generator 100 is in an inoperative state and in addition the charge voltage of the secondary power source SS has reduced to a value which is insufficient to drive the timepiece driving circuit 200.

Figure 3A:
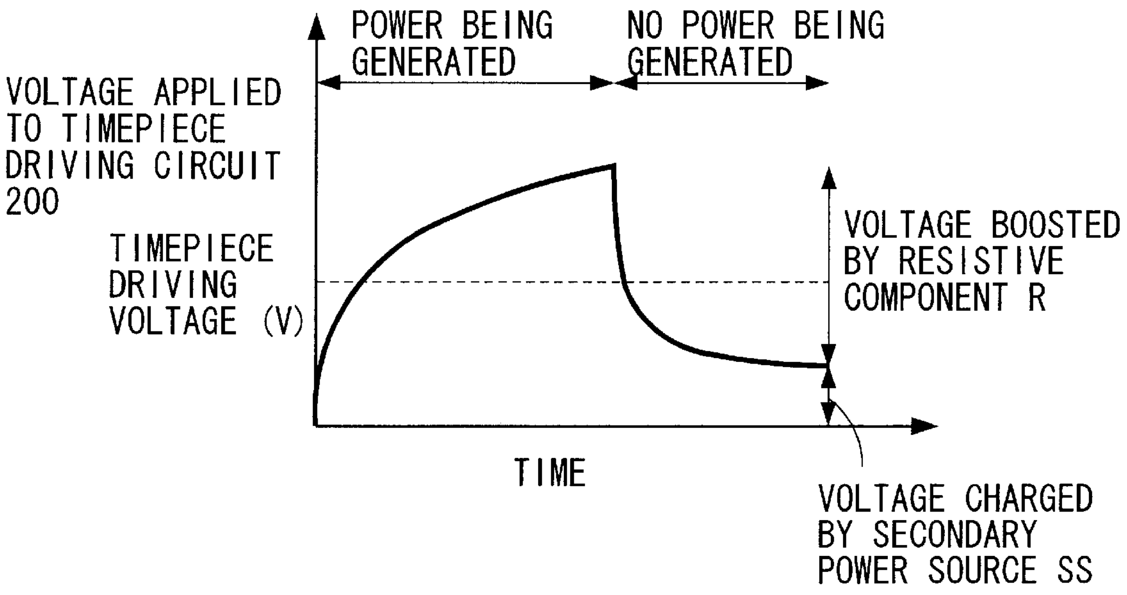
FIG. 3A illustrates the change over time in the voltage to be applied to a timepiece driving circuit 200 of the embodiment illustrated in FIG. 1.

More specifically, the resistance value of the resistive component R is set to a value such that the voltage to be applied to the timepiece driving circuit 200 can be increased to a voltage which is sufficient to drive the timepiece driving circuit 200 at the start-up of the generator 100 (at the beginning of power generation), as illustrated in FIG. 3A.

The voltage to be applied to the timepiece driving circuit 200 is equal to the voltage between VDD and VSS. The voltage sufficient to drive the timepiece driving circuit 200 is a voltage (the lowest driving voltage) which is indicated by a broken line in FIG. 3A.

Figure 3B:
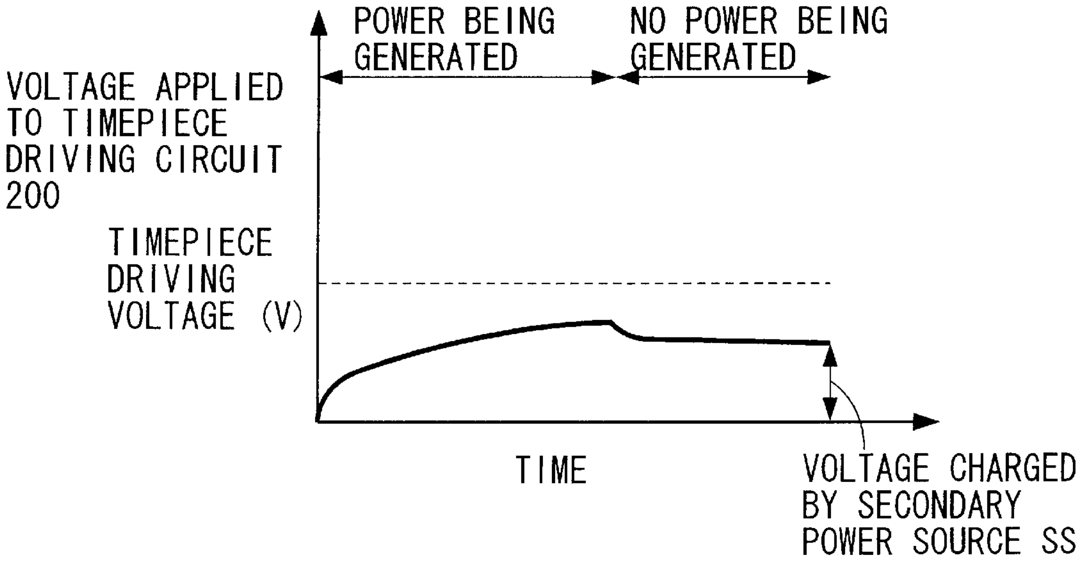
FIG. 3B illustrates the change over time in the applied voltage, for comparison, where there is no resistive component R for charging.

FIG. 3B illustrates, for reference, the change over time in the voltage to be applied to the timepiece driving circuit 200 under similar power generation conditions to those of FIG. 3A, but where there is no charging resistive component.

Specifically, FIG. 3(*a*) illustrates the change over time in the voltage to be applied to the timepiece driving circuit 200 in a configuration in which the resistive component R is removed from the configuration illustrated in FIG. 1.

A specific value of the resistance of the resistive component R can be calculated based on the respective values of the oscillation starting voltage in the timepiece driving circuit 200, the voltage remaining in the secondary power source SS when the timepiece stops operating, and the current generated by the generator 100 at the start-up of the timepiece.

More specifically, the resistance value of the resistive component R can be set based on the following formula:

Resistance value *R* [106 ]=(Oscillation starting voltage [*V*]–Remaining voltage when timepiece stops [*V*]) /Generated current [*A*]

For example, consider a case where the oscillation starting voltage is 0.7 V, the remaining voltage when the timepiece stops operating is 0.1 V, and the generated current is 0.006 A.

In this case, according to the formula shown above, the resistance value of the resistive component R is calculated as 100 Ω. Therefore, by setting the resistance value of the resistive component R to be 100 Ω, it is possible to quickly resume the operation of a timepiece after the timepiece has stopped operating.

In the formula shown above, the term representing the remaining voltage when the timepiece stops operating may be omitted if, for example, it is always 0 V. As long as the resistance value is equal to or greater than the value obtained from the above formula, it is possible to ensure that the voltage to be applied to the timepiece driving circuit 200 is, at the time of start-up, equal to or greater than the lowest driving voltage. However, as the value of the resistive component R increases, the voltage applied to the capacitive component C decreases, thereby hindering the charging operation. Therefore, it is desirable to set the resistance value within a certain range from the value obtained by the above formula.

The formula shown above also indicates that the value of the resistive component R can be reduced by employing a generator having a high power generation capability.

The formula shown above also indicates that with the use of a generator having a poor power generation capability, a sufficient voltage at the start-up can be ensured by means of increasing the value of the resistive component R.

In the above-described example, if the resistance value is equal to or greater than 100 Ω, it is possible to immediately start up the timepiece even when the voltage of the secondary power source is in the vicinity of 0 V. A resistive component having such a resistance value, about 100 Ω, can be implemented either with a lithium secondary battery using titanium oxide and manganese oxide or a lithium secondary battery using a carbon material and lithium titanate, as described above.

In the configuration illustrated in FIG. 1, the secondary power source SS and the auxiliary capacitor CB are connected in parallel to each other.

Alternatively, a voltage increasing/decreasing circuit which is formed by, for example, a charge pump circuit including a plurality of capacitors and switches can be interposed between the secondary power source SS and the auxiliary capacitor CB. In such a case, the charge voltage of the secondary power source SS or the voltage generated by the generator 100 may be increased or decreased to obtain an increased or decreased voltage which is then applied to the auxiliary capacitor CB and the timepiece driving circuit 200. In such a case, it is not necessary to change the connection on the ground voltage VDD side if the voltage increasing/decreasing circuit is provided so as to increase/decrease the voltage between the VSS side terminal of the secondary power source SS and the VSS side terminal of the auxiliary capacitor CB.

As described above, according to the embodiment of the present invention illustrated in FIG. 1, the resistive component which is inherent to the structure of the secondary power source SS is used to cause a voltage drop which is required at the start-up.

Thus, it is possible to eliminate the connection and the power supply line which are used, in the conventional example described above with reference to FIG. 8, for detecting the voltage VSCP at one terminal of the capacitor 502.

How to connect the secondary power source SS in the electronic timepiece illustrated in FIG. 1 will now be described with reference to FIG. 4.

Figure 4:
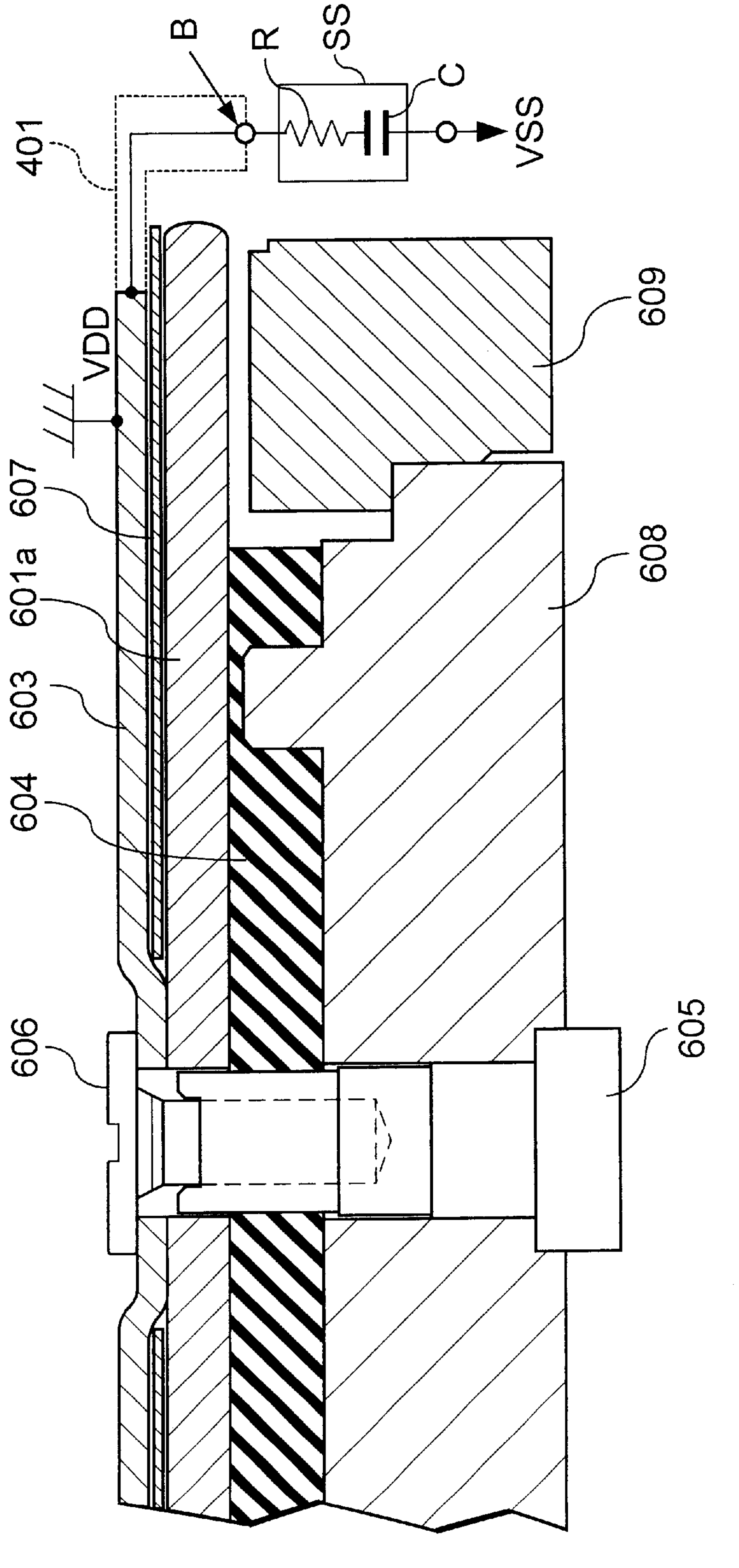
FIG. 4 is a schematic cross-sectional view illustrating a part of the electronic timepiece illustrated in FIG. 1.
Figure 9:
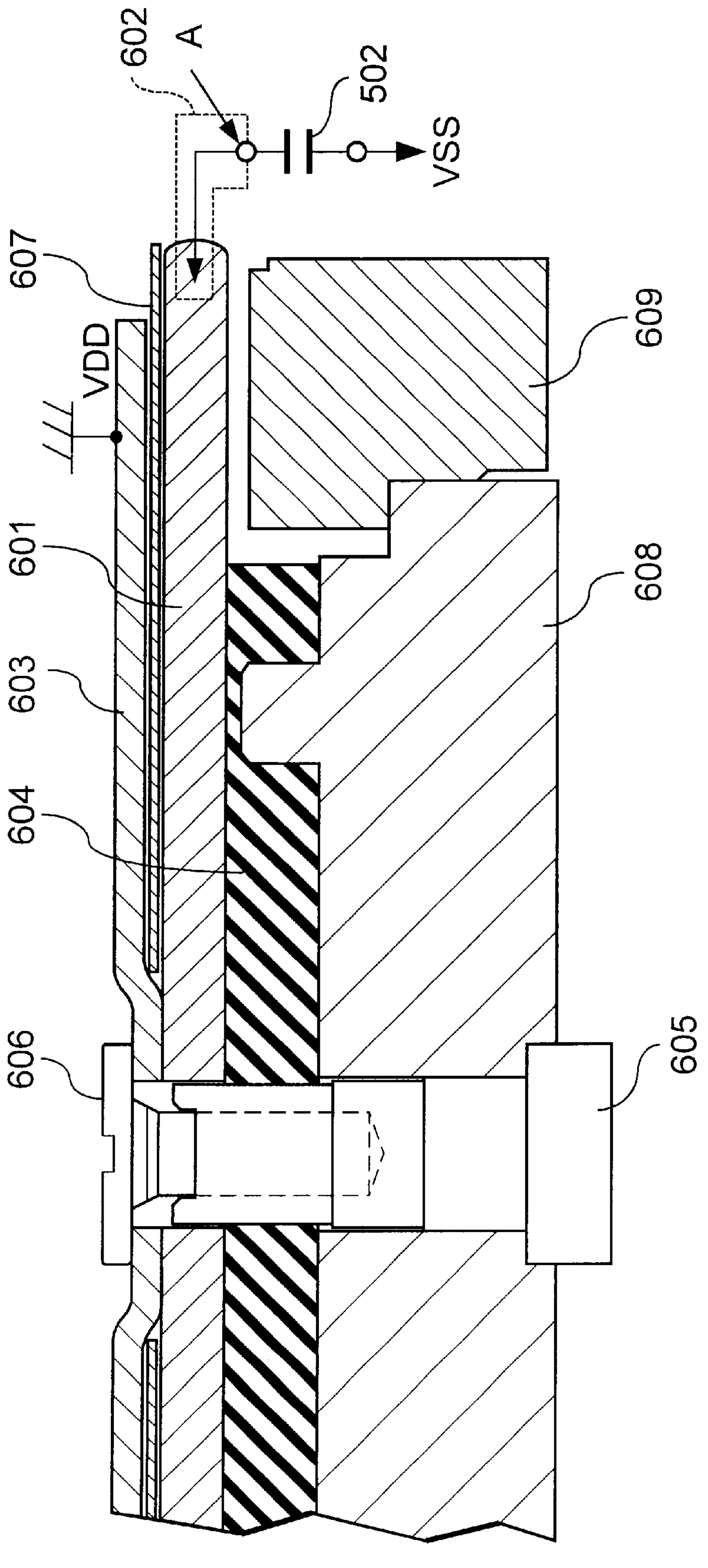
FIG. 9 PRIOR ART
FIG. 9 is a schematic cross-sectional view illustrating a part of the electronic timepiece illustrated in FIG. 8.

In FIG. 4, the same elements as those shown in FIG. 9 are denoted by the same reference numerals and will not be further described below.

In the present embodiment, the high voltage side (positive side) terminal of the secondary power source SS can be grounded directly to the VDD voltage point. Therefore, the high voltage side (positive side) terminal B of the secondary power source SS can be electrically directly connected to the circuit hold plate 603, by connecting the terminal B either directly to the circuit hold plate 603 or via a securing member (the portion indicated by a broken line 401) using a connection terminal, a screw, or the like, which has a high rigidity.

On a circuit board 601*a,* it is no longer necessary to wire a power supply line for the terminal voltage VSCP which is required in the conventional configuration illustrated in FIG. 8. Therefore, it is possible to save some area on the board corresponding to the area which would otherwise be required for insulation.

In addition, it is possible to eliminate the counterpart contact point for the contact point spring which is required for detecting the terminal voltage VSCP. Therefore, it is possible to reduce the size of the circuit board 601*a* as compared with that in the prior art.

Next, a more specific example and a variation of the embodiment of the present invention illustrated in FIG. 1 will be described with reference to FIGS. 5 and 6.

Figure 5:
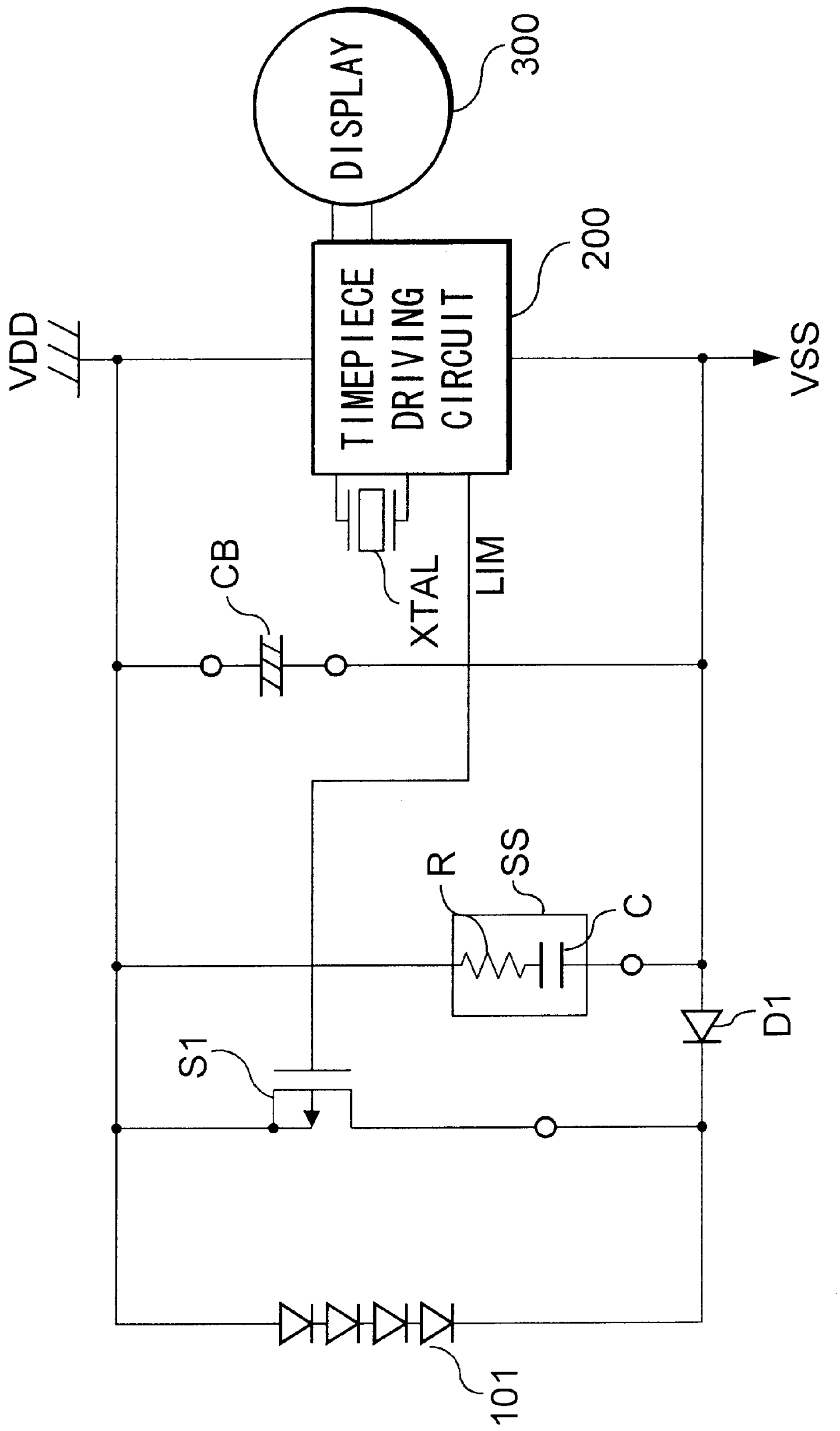
FIG. 5 is a block diagram illustrating a configuration as illustrated in FIG. 1 where a specific generator (a solar power generator 101) is employed for a generator 100.

FIG. 5 is a block diagram showing a specific example of the generator 100 of FIG. 1.

Figure 6:
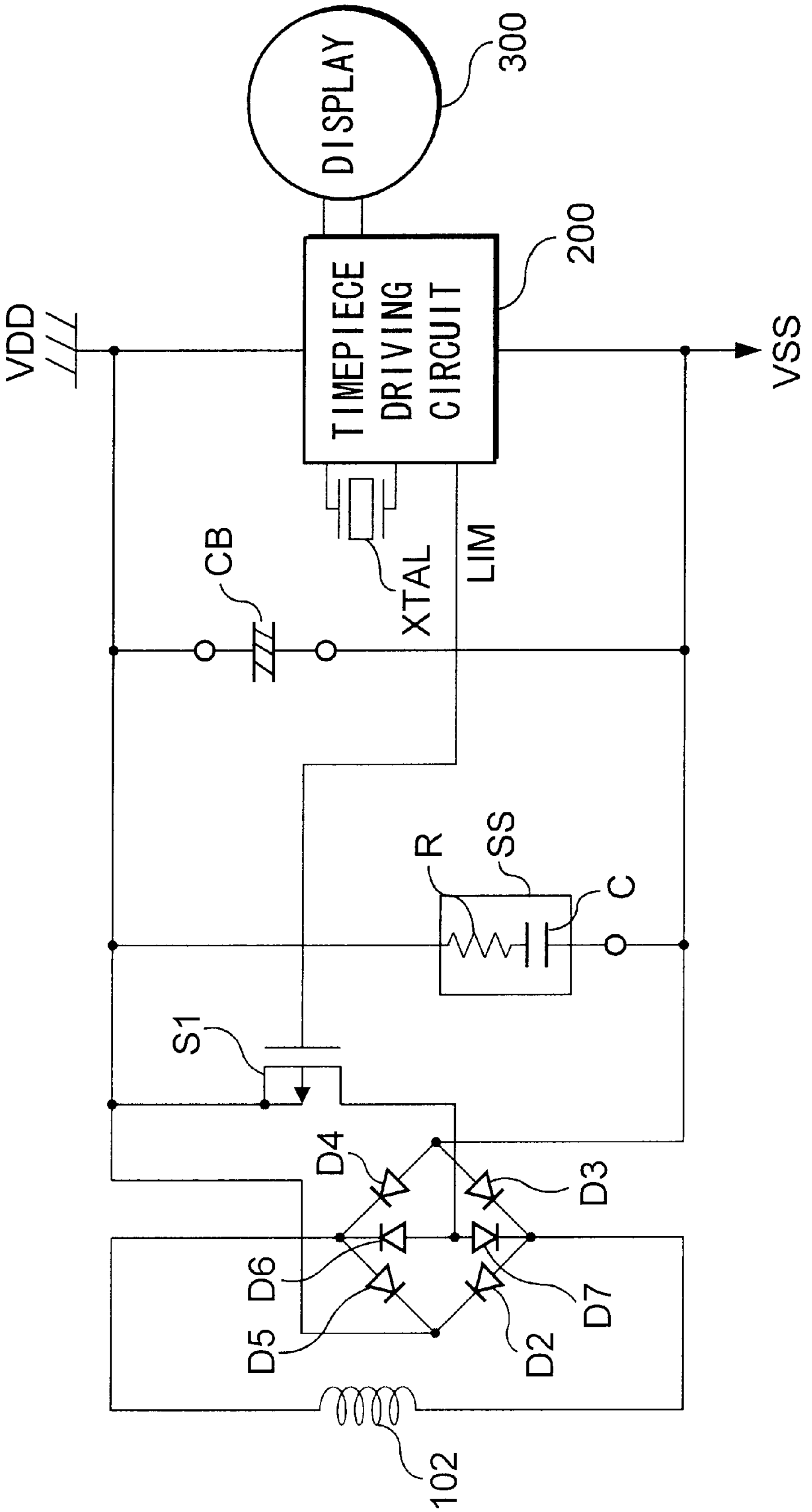
FIG. 6 is a block diagram illustrating a variation of the embodiment illustrated in FIG. 1.

In FIG. 6, a solar power generator (a solar battery) 101 is employed in place of the generator 100 of FIG. 1. Other DC generator such as a photoelectric power generator, a thermoelectric power generator, or the like, may be used with the present embodiment simply by replacing the generator 100 of FIG. 1 with such a generator.

FIG. 6 is a block diagram illustrating a configuration where the generator 100 of FIG. 1 is replaced with an AC power generator 102 such as an magnetoelectric power generator, a piezoelectric power generator, or the like. In this case, a full-wave rectifier circuit including four diodes D2 to D5 is used to rectify the voltage generated by the AC power generator 102 into a direct current. In such a case, it is not necessary to employ the reverse flow prevention diode D1 of FIG. 1.

A diode D6 and a diode D7 are further provided, whose anodes are both connected to the drain of the limit control switch S1 and whose cathodes are connected to the respective output terminals of the AC power generator 102, whereby it is possible to short-circuit the output terminals of the AC power generator 102 with each other by means of the switch S1.

Figure 7:
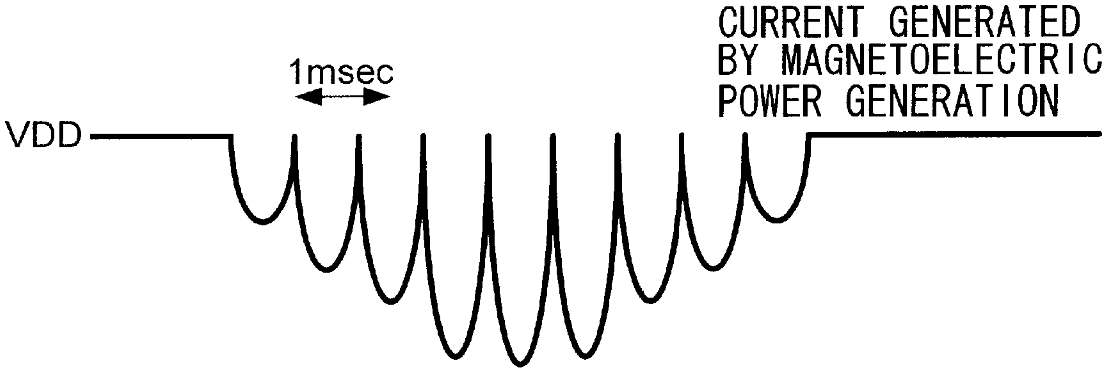
FIG. 7 is a waveform diagram illustrating the change over time in the generated current according to the embodiment illustrated in FIG. 6.

FIG. 7 illustrates the change over time in the generated current after fullwave rectification where a magnetoelectric power generator is used as the AC power generator 102 illustrated in FIG. 6.

In the case of an AC power generation, the generated current varies periodically, as illustrated in FIG. 7. Therefore, it is desirable that the time constant for charging the secondary power source SS is within a range such that it is possible to respond to the change in the generated current (the cycle after fullwave or half-wave rectification). For example, where the zero crossing interval in the waveform of a generated AC current after full-wave rectification is 1 ms, as in the illustrated example, the time constant RtC based on the equivalent capacitive component C and the resistive component R of the secondary power source SS is desirably less than or equal to 1 ms.

As described above, according to the present embodiment, it is possible to eliminate the diodes and resistors for increasing the voltage.

Moreover, it is possible to eliminate the power supply line which is used for detecting the charge voltage of the secondary power source and the connection member which is used for connecting the power supply line.

As a result, it is possible to obtain the following effects:

(1) The power supply line for the terminal voltage VSCP which is required in a conventional circuit is eliminated, whereby it is possible to improve the spatial efficiency of circuit blocks on a circuit board;

(2) The power supply line for the terminal voltage VSCP is eliminated, whereby it is possible to eliminate an insulating member such as an insulating film, or the like, which is required in the prior art on the circuit board or on connecting points to the circuit board for providing an insulation from an outer package member;

(3) It is no longer necessary to provide an insulation between the positive side terminal of the secondary power source and an outer package member (VDD voltage);

(4) There is no longer an influence from variations in potential or noise along the power supply line for the terminal voltage VSCP, whereby it is possible to reduce the possibility of a malfunction of the entire circuit due to noise.

What is claimed is:

1. An electronic timepiece comprising:

a timepiece driving circuit for performing a time-keeping operation;

a display circuit for displaying time information from said timepiece driving circuit, wherein;

a generator for generating electric energy utilizing at least one type of external energy; and a capacitor device for storing said electric energy generated by said generator and supplying said stored electric energy to said timepiece driving circuit, said capacitor device comprising an equivalent capacitive component for storing an electric charge and a resistive component formed by a part of said equivalent capacitive component, said resistive component having a resistance causing a voltage drop due to a charging current from said generator when said generator outputs a current equal to or greater than a predetermined value, said voltage drop making a voltage applied to said timepiece driving circuit equal to or greater than an operation starting voltage by which said timepiece driving circuit starts operating;

wherein said timepiece driving circuit is coupled in parallel to said capacitor device, and said timepiece driving circuit and said capacitor device are jointly coupled across said generator.

2. An electronic timepiece according to claim 1, wherein said resistive component has a resistance value which is equal to or greater than a value obtained by dividing said operation starting voltage of said timepiece driving circuit by a current generated by said generator, or a value obtained by dividing a difference between a remaining charge voltage of said capacitor device at a time when said timepiece driving circuit stops operating and said operation starting voltage of said timepiece driving circuit by said current generated by said generator.

3. An electronic timepiece according to claim 1, wherein said generator comprises a solar power generator, a photoelectric power generator, a magnetoelectric power generator, a thermoelectric power generator, or a piezoelectric power generator.

4. An electronic timepiece according to claim 1, wherein said capacitor device comprises one capacitive component and one resistive component which are serially connected with each other.

5. An electronic timepiece according to claim 1, wherein said capacitor device comprises a plurality of pairs of capacitive components and resistive components which are connected in parallel to one another, each pair having one capacitive component and one resistive component which are serially connected with each other.

6. An electronic timepiece according to claim 1, wherein said capacitor device has a lithium secondary battery comprising an electrolytic solution of an organic solvent having a lithium salt dissolved therein, a negative pole activator using titanium oxide, and a positive pole activator using manganese oxide.

7. An electronic timepiece according to claim 1, wherein said capacitor device has a lithium secondary battery comprising an electrolytic solution of an organic solvent having a lithium salt dissolved therein, a negative pole activator using a carbon material, and a positive pole activator using lithium titanate.

8. An electronic timepiece according to claim 1, wherein said capacitor device comprises an electrolytic capacitor.

9. An electronic timepiece according to claim 1, wherein said generator comprises an AC generator, and a charging time constant of said capacitor device is less than or equal to one cycle of a half-wave- or full-wave-rectified waveform of a current generated by said AC generator.

10. An electronic timepiece according to claim 1, wherein one terminal of said capcitor device is grounded to a ground potential which is common among said generator, said timepiece driving circuit and said capacitor device.

11. An electronic timepiece according to claim 1, wherein one terminal of said capacitor device is grounded to an electrically conductive attachment member having said ground potential.

12. An electronic timepiece, comprising:

a generator for receiving at least one type of external energy and converting the external energy into electric energy;

a charge storer for storing the electric energy generated by said generator;

a timepiece circuit connected in parallel to said charge storer for performing a time-keeping operation, said timepiece circuit being driven by the electric energy generated by said generator or the electric energy stored in said charge storer;

a display circuit for displaying time information from said timepiece circuit; and a charging device according to claim 1.

13. In a method for controlling a charging device for an electronic timepiece comprising: a generator for receiving at least one type of external energy and converting the external energy into electric energy; a capacitor device for storing the electric energy generated by said generator; a charging device for charging said charge storer; a timepiece circuit connected in parallel to said charge storer for performing a time-keeping operation, said timepiece circuit being driven by the electric energy generated by said generator or the electric energy stored in said charge storer; and a display circuit for displaying time information from said timepiece circuit, the method comprises steps of:

connecting the timepiece circuit in parallel to said charge storer;

forming said charge storer by an equivalent capacitive component for storing an electric charge and a resistive component formed by a part of said equivalent capacitive component; and setting a resistance value of the resistive component in such manner that when said generator outputs a current equal to or greater than a predetermined value by means of resistance value of said resistive component, a voltage to be applied to said timepiece circuit by said generator is equal to or greater than a voltage at which said timepiece circuit starts operating.

14. An electronic timepiece charging device for charging an electronic timepiece comprising: a generator for receiving at least one type of external energy and converting the external energy into electric energy; a charge storer for storing the electric energy generated by said generator; a timepiece circuit connected in parallel to said charge storer for performing a time-keeping operation, said timepiece circuit being driven by the electric energy generated by said generator or the electric energy stored in said charge storer; and a display circuit for displaying time information from said timepiece circuit, wherein:

said timepiece circuit is connected in parallel to said charge storer;

said charge storer comprises at least an equivalent capacitive component for storing an electric charge and a resistive component; and where a voltage in said charge storer to be supplied to said timepiece circuit is less than an operation starting voltage of said timepiece circuit, and when said timepiece circuit has stopped operating and in addition when a charging current flows into said charge storer due to power generation by said generator, said the charge storer supplies to said timepiece circuit a voltage which is equal to or greater than the operation starting voltage of said timepiece circuit by utilizing at least a voltage difference caused by said resistive component.

15. In a method for controlling a charging device for an electronic timepiece comprising: a generator for receiving at least one type of external energy and converting the external energy into electric energy; a charge storer for storing the electric energy generated by said generator; a timepiece circuit connected for performing a time-keeping operation, said timepiece circuit being driven by the electric energy generated by said generator or the electric energy stored in said charge storer; and a display circuit for displaying time information from said timepiece circuit, the method comprises steps of:

connecting said timepiece circuit in parallel to said charge storer;

forming said charge storer by at least an equivalent capacitive component for storing an electric charge and a resistive component; and where a voltage in said charge storer to be supplied to said timepiece circuit is less than an operation starting voltage of said timepiece circuit, and when said timepiece circuit has stopped operating and in addition when a charging current flows into said charge storer due to power generation by said generator, controlling said charge storer to supply to said timepiece circuit a voltage which is equal to or greater than the operation starting voltage of said timepiece circuit by utilizing at least a voltage difference caused by said resistive component.

16. A chargeable power supply according to claim 12, wherein said capacitor device comprises a plurality of pairs of capacitor components and resistive components which are connected in parallel to one another, each pair having one capacitive- component and one resistive component which are serially connected with each other.

17. A chargeable power supply according to claim 12, wherein said capacitor device has a lithium secondary battery comprising an electrolytic solution of an organic solvent having a lithium salt dissolved therein, a negative pole activator using titanium oxide, and a positive pole activator using manganese oxide.

18. A chargeable power supply according to claim 12, wherein said capacitor device has a lithium secondary battery comprising an electrolytic solution of an organic solvent having a lithium salt dissolved therein, a negative pole activator using a carbon material, and a positive pole activator using lithium titanate.

19. A chargeable power supply according to claim 12, wherein said capacitor device comprises an electrolytic capacitor.

20. A chargeable power supply according to claim 12, wherein said generator comprises an AC generator, and a charging time constant of said capacitor device is less than or equal to one cycle of a half-wave- or full-wave-rectified waveform of a current generated by said AC generator.

21. A chargeable power supply according to claim 12, wherein one terminal of said capacitor device is grounded to a ground potential which is common among said generator, said timepiece driving circuit and said capacitor device.

22. A chargeable power supply according to claim 12, wherein one terminal of said capacitor device is grounded to an electrically conductive attachment member having said ground potential.

* * * * *

UNITED STATES PATENT AND TRADEMARK OFFICE

CERTIFICATE OF CORRECTION

PATENT NO. : 6,522,603 B1
DATED : February 18, 2003
INVENTOR(S) : Fumiaki Miyahara et al.

It is certified that error appears in the above-identified patent and that said Letters Patent is hereby corrected as shown below:

Column 12,
Line 62, please delete ", wherein" after "driving circuit".

Column 13,
Line 6, remove carriage return after "when said" so as to continue with the following line and read -- when said generator outputs a current… --.

Column 14,
Line 1, after "12. ", delete:

"An electronic timepiece, comprising:

a generator for receiving at least one type of external energy and converting the external energy into electric energy;

a charge storer for storing the electric energy generated by said generator;

a timepiece circuit connected in parallel to said charge storer for performing a time-keeping operation, said timepiece circuit being driven by the electric energy generated by said generator or the electric energy stored in said charge storer;

a display circuit for displaying time information from said timepiece circuit; and a charging device according to claim 1."

and in its place, please insert:

--A chargeable power supply for an electronic timepiece comprising a timepiece driving circuit for performing a time-keeping operation and a display circuit for displaying time information from said timepiece driving circuit, said power supply comprising:

a generator for generating electric energy utilizing at least one type of external energy; and a capacitor device for storing said electric energy generated by said generator and supplying said stored electric energy to said timepiece driving circuit, said capacitor device comprising an equivalent capacitive component for storing an electric charge and a resistive component formed by a part of said equivalent capacitive component, said resistive component having a resistance causing a voltage drop due to a charging current from said generator when said generator outputs a current equal to or greater than a predetermined value, said voltage drop making a voltage applied to said timepiece driving circuit equal to or greater than an operation starting voltage by which said timepiece driving circuit starts operating, wherein said timepiece driving circuit is coupled in parallel to said capacitor device, and said timepiece driving circuit and said capacitor device are jointly coupled across said generator.--

UNITED STATES PATENT AND TRADEMARK OFFICE
CERTIFICATE OF CORRECTION

PATENT NO. : 6,522,603 B1
DATED : February 18, 2003
INVENTOR(S) : Fumiaki Miyahara et al.

It is certified that error appears in the above-identified patent and that said Letters Patent is hereby corrected as shown below:

Column 14, cont'd,
Line 15, after "13. ", please delete:

"In a method for controlling a charging device for an electronic timepiece comprising: a generator for receiving at least one type of external energy and converting the external energy into electric energy; a capacitor device for storing the electric energy generated by said generator; a charging device for charging said charge storer; a timepiece circuit connected in parallel to said charge storer for performing a time-keeping operation, said timepiece circuit being driven by the electric energy generated by said generator or the electric energy stored in said charge storer; and a display circuit for displaying time information from said timepiece circuit, the method comprises steps of:

connecting the timepiece circuit in parallel to said charge storer;

forming said charge storer by an equivalent capacitive component for storing an electric charge and a resistive component formed by a part of said equivalent capacitive component; and setting a resistance value of the resistive component in such manner that when said generator outputs a current equal to or greater than a predetermined value by means of resistance value of said resistive component, a voltage to be applied to said timepiece circuit by said generator is equal to or greater than a voltage at which said timepiece circuit starts operating."

and in its place, please insert:

--A chargeable power supply according to claim 12, wherein said resistive component has a resistance value which is equal to or greater than a value obtained by dividing said operation starting voltage of said timepiece driving circuit by a current generated by said generator, or a value obtained by dividing a difference between a remaining charge voltage of said capacitor device at a time when said timepiece driving circuit stops operating and said operation starting voltage of said timepiece driving circuit by said current generated by said generator.--

UNITED STATES PATENT AND TRADEMARK OFFICE
CERTIFICATE OF CORRECTION

PATENT NO. : 6,522,603 B1
DATED : February 18, 2003
INVENTOR(S) : Fumiaki Miyahara et al.

It is certified that error appears in the above-identified patent and that said Letters Patent is hereby corrected as shown below:

Column 14, cont'd,
Line 40, after "14. ", please delete:

"An electronic timepiece charging device for charging an electronic timepiece comprising: a generator for receiving at least one type of external energy and converting the external energy into electric energy; a charge storer for storing the electric energy generated by said generator; a timepiece circuit connected in parallel to said charge storer for performing a time-keeping operation, said timepiece circuit being driven by the electric energy generated by said generator or the electric energy stored in said charge storer; and a display circuit for displaying time information from said timepiece circuit, wherein:

said timepiece circuit is connected in parallel to said charge storer;

said charge storer comprises at least an equivalent capacitive component for storing an electric charge and a resistive component; and where a voltage in said charge storer to be supplied to said timepiece circuit is less than an operation starting voltage of said timepiece circuit, and when said timepiece circuit has stopped operating and in addition when a charging current flows into said charge storer due to power generation by said generator, said the charge storer supplies to said timepiece circuit a voltage which is equal to or greater than the operation starting voltage of said timepiece circuit by utilizing at least a voltage difference caused by said resistive component."

and in its place, please insert:

--A chargeable power supply according to claim 12, wherein said generator comprises a solar power generator, a photoelectric power generator, a magnetoelectric power generator, a thermoelectric power generator, or a piezoelectric power generator.--

Column 15,
Line 1, after "15. ", please delete:

"In a method for controlling a charging device for an electronic timepiece comprising: a generator for receiving at least one type of external energy and converting the external energy into electric energy; a charge storer for storing the electric energy generated by said generator; a timepiece circuit connected for performing a time-keeping operation, said timepiece circuit being driven by the electric energy generated by said generator or the electric energy stored in said charge storer; and a display circuit for displaying time information from said timepiece circuit, the method comprises steps of:

UNITED STATES PATENT AND TRADEMARK OFFICE

CERTIFICATE OF CORRECTION

PATENT NO. : 6,522,603 B1
DATED : February 18, 2003
INVENTOR(S) : Fumiaki Miyahara et al.

It is certified that error appears in the above-identified patent and that said Letters Patent is hereby corrected as shown below:

Column 15,
Line 1, cont'd, connecting said timepiece circuit in parallel to said charge storer;

forming said charge storer by at least an equivalent capacitive component for storing an electric charge and a resistive component; and where a voltage in said charge storer to be supplied to said timepiece circuit is less than an operation starting voltage of said timepiece circuit, and when said timepiece circuit has stopped operating and in addition when a charging current flows into said charge storer due to power generation by said generator, controlling said charge storer to supply to said timepiece circuit a voltage which is equal to or greater than the operation starting voltage of said timepiece circuit by utilizing at least a voltage difference caused by said resistive component."

and in its place, please insert:

--A chargeable power supply according to claim 12, wherein said capacitor device comprises one capacitive component and one resistive component which are serially connected with each other.--

Signed and Sealed this

Twelfth Day of August, 2003

JAMES E. ROGAN
*Director of the United States Patent and Trademark Office*